(12) United States Patent
Shivamoggi et al.

(10) Patent No.: US 11,128,667 B2
(45) Date of Patent: Sep. 21, 2021

(54) CLUSTER DETECTION AND ELIMINATION IN SECURITY ENVIRONMENTS

(71) Applicant: Rapid7, Inc., Boston, MA (US)

(72) Inventors: Vasudha Shivamoggi, Cambridge, MA (US); Roy Hodgman, Cambridge, MA (US); Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 314 days.

(21) Appl. No.: 16/203,710

(22) Filed: Nov. 29, 2018

(65) Prior Publication Data

US 2020/0177633 A1 Jun. 4, 2020

(51) Int. Cl.
*H04L 29/06* (2006.01)
*G06F 16/28* (2019.01)
*G06N 20/00* (2019.01)

(52) U.S. Cl.
CPC ............ *H04L 63/20* (2013.01); *G06F 16/285* (2019.01); *G06N 20/00* (2019.01)

(58) Field of Classification Search
CPC ....... H04L 63/20; G06F 16/285; G06N 20/00; G06N 20/20
USPC .......................................................... 726/23
See application file for complete search history.

(56) References Cited

U.S. PATENT DOCUMENTS

| 10,268,749 | B1* | 4/2019 | Roy | G06F 16/2246 |
|---|---|---|---|---|
| 10,592,328 | B1* | 3/2020 | Thompson | G06F 11/0793 |
| 2016/0110427 | A1* | 4/2016 | Ma | H04M 1/72525 |
| | | | | 715/765 |
| 2016/0261622 | A1* | 9/2016 | Danielson | H04L 67/1095 |
| 2017/0019312 | A1* | 1/2017 | Meyer | G06N 20/00 |
| 2017/0083608 | A1* | 3/2017 | Ye | G06N 20/10 |
| 2017/0310691 | A1* | 10/2017 | Vasseur | H04L 63/1458 |
| 2019/0205698 | A1* | 7/2019 | Liu | G06Q 50/01 |
| 2019/0260784 | A1* | 8/2019 | Stockdale | H04L 63/1441 |

\* cited by examiner

*Primary Examiner* — Saleh Najjar
*Assistant Examiner* — Peiliang Pan
(74) *Attorney, Agent, or Firm* — Ashwin Anand

(57) ABSTRACT

Disclosed herein are methods, systems, and processes to detect valid clusters and eliminate spurious clusters in cybersecurity-based computing environments. A cluster detection and elimination model is trained by accessing a dataset with raw data that includes data points associated with computing devices in a network and applying two or more different clustering methodologies independently to the dataset. The resulting cluster detection and elimination model is used to compare two or more clusters to determine whether a cluster from one clustering methodology matches another cluster from another clustering methodology based on centroid locations and shared data points.

14 Claims, 9 Drawing Sheets

Cluster Detection and Elimination Table 305

| Dimension 'X' Field 310 | Dimension 'Y' Field 315 | Data Points Field 320 | 1st Clustering Methodology Field 325 | 2nd Clustering Methodology Field 330 | Clusters Comparison Field 335 | Centroid Locations Field 340 | Shared Assets Field 345 | Security Action Field 350 |
|---|---|---|---|---|---|---|---|---|
| No. of connections | Avg. duration of connections | 220(1)-(300) | K-Means | Agglomerative | 205(1) 205(3) | Not Near | Few | Eliminate |
| No. of attempts | Geo location 'xyz' | 220(1)-(200) | Mean-Shift | K-Means | 205(1) 205(2) | Near | Large | Keep |
| No. of assets | Asset behavior 'abc' | 220(1)-(250) | DBSCAN | EM | 205(3) 205(5) | Near | Few | Eliminate |
| No. of users | User behavior 'pqr' | 220(1)-(350) | Agglomerative | K-Means | 205(2) 205(4) | Not Near | Large | Keep |
| No. of logins | Avg. duration of session | 220(1)-(150) | K-Means | DBSCAN | 205(1) 205(5) | Near | Large | Keep |
| No. of scans | Vulnerability 'mno' | 220(1)-(450) | K-Means | Mean-Shift | 205(4) 205(5) | Not Near | Few | Eliminate |
| ... | ... | ... | ... | ... | ... | ... | ... | ... |

300

FIG. 3

CLUSTER DETECTION AND ELIMINATION IN SECURITY ENVIRONMENTS

BACKGROUND

Field of the Disclosure

This disclosure is related to computer and network security. In particular, this disclosure is related to detecting and eliminating spurious clusters using ensemble methods.

Description of the Related Art

Modern cybersecurity tools gather and depend on vast amounts of security data to effectively perform security-related computing tasks such as incident detection, vulnerability management, security orchestration, and the like. For example, security data related to what bots and attackers are doing in, across, and against cloud computing environments can be gathered by recording telemetry associated with connections and incoming attacks and can be used to identify techniques and procedures used by such bots and attackers.

Given the global distribution of potentially malicious bots and attackers as well as the vast number of corresponding computing systems, generating actionable security data that can be meaningfully used to take proactive and time-sensitive security action(s) requires efficient and timely analysis of the collected security data. For example, machine learning tools can be used to analyze and understand such security data.

Unfortunately, existing machine learning tools for cluster analysis are susceptible to noise in a dataset that can lead to unwanted variation in clustering results. This instability is undesirable when analyzing collected security data to determine abnormal computing actions associated with vulnerable user behavior, potentially malicious conditions, and the like. Therefore, existing machine learning tools (e.g., for clustering) cannot be relied upon to make sense of collected security data for the purpose of implementing effective and time-sensitive offensive and defensive plans in modern cybersecurity computing environments.

SUMMARY OF THE DISCLOSURE

Disclosed herein are methods, systems, and processes for cluster detection and elimination in security environments. One such method involves training a cluster detection and elimination model by accessing a dataset with raw data that includes datapoints associated with computing devices in a network and applying at least two (or more) clustering methodologies independently to the dataset. The resulting ensemble clustering methodology includes comparing two (or more) clusters and determining whether a cluster from one clustering method matches another cluster from another clustering method based on centroid locations and shared data points.

In one embodiment, the method trains the cluster detection and elimination model by applying at least two clustering methodologies independently to the dataset without indicating a value for an initial cluster starting point. In another embodiment, at least two or more clusters are formed by the application of at least two (or more) clustering methodologies independently to the dataset, and the value for the initial cluster starting point is unknown or randomized prior to the application of the at least two clustering methodologies independently to the dataset.

In certain embodiments, comparing clusters based on centroid locations includes determining whether a centroid of a cluster is located near another centroid of another cluster in feature space relative to other centroids of other clusters, and comparing clusters based on shared data points includes determining whether the cluster and another cluster share a significant number of data points associated with the computing devices relative to the other clusters.

In some embodiments, based on the comparison, the method isolates a spurious cluster, inhibits computing devices identified by data points in the spurious cluster from being included in a security operation, identifies computing devices associated with data points in a non-spurious cluster, and designates the computing devices associated with the data points in the non-spurious cluster in the security operation.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

FIG. 3 is a table 300 maintained by a security server that can be used to perform cluster detection and elimination, according to one embodiment of the present disclosure.

Figure 1:
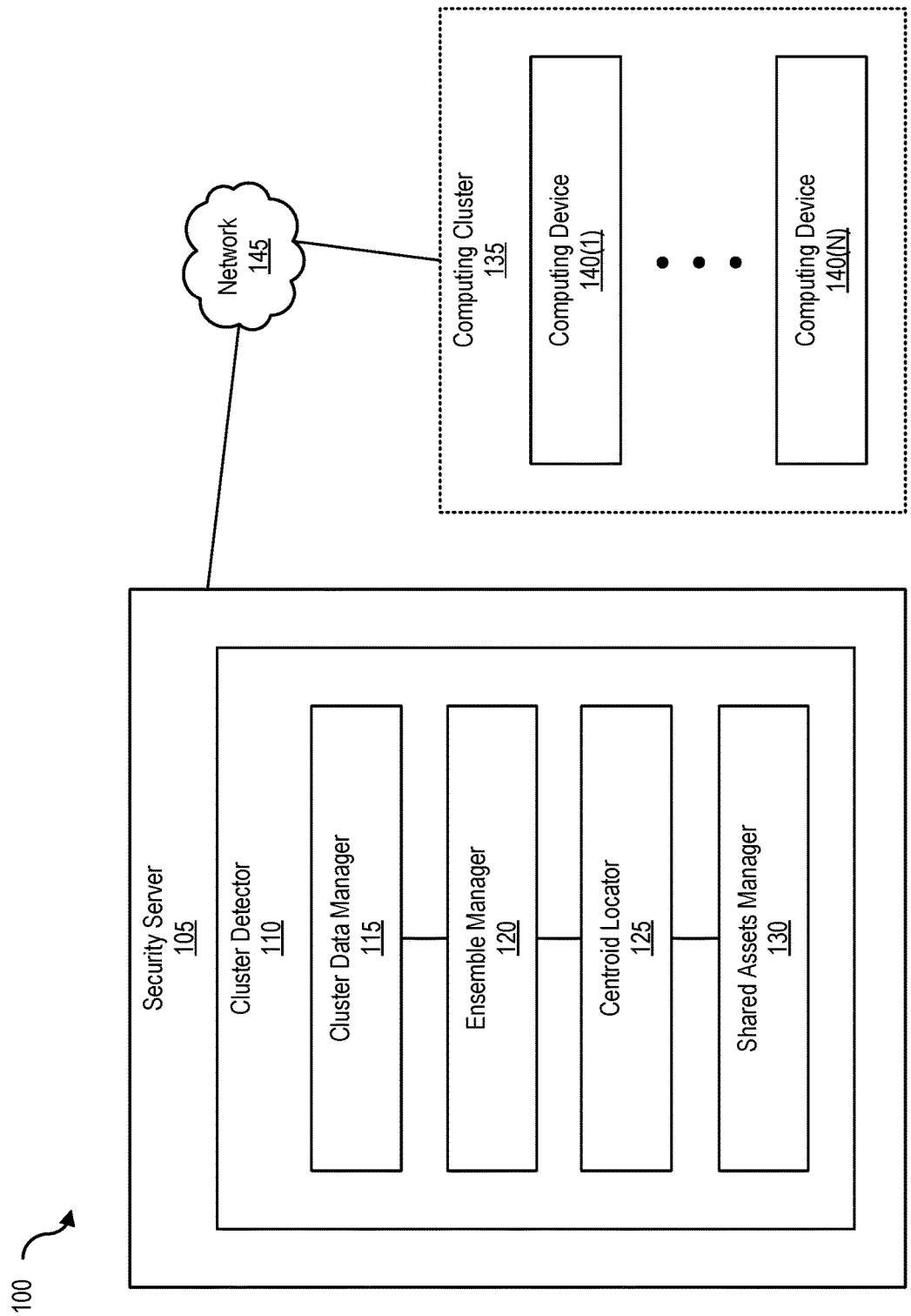
FIG. 1 is a block diagram 100 of a security server that performs cluster detection and elimination, according to one embodiment of the present disclosure.

Specific embodiments are examples in the diagrams and do not limit the disclosure to the particular form disclosed. Instead, they cover all modifications, equivalents and alternatives falling within the spirit and scope of the disclosure as defined by the appended claims.

DETAILED DESCRIPTION

Introduction

Implementing an effective cybersecurity program requires a thorough understanding of what potential malicious attackers and enterprise users alike are doing in, across, and against cloud and distributed computing environments. Such an understanding can only be garnered by the collection of a vast amount of security data and analyzing such data security data for actionable intelligence regarding user behavior, security vulnerabilities, malicious incidents, attacker behavior, and the like. For example, security data associated with attacker methodologies, credential events, and exploitation events permits enterprises to undertake a rational and objective assessment of attacker behaviors and potential impacts.

Security data collection tools such as Rapid7® Inc.'s Project Heisenberg can be used to track connections to—and the probing and attempted exploitation of—various computing services on a large set of globally distributed computing systems. Similarly, Rapid7®, Inc.'s Project Sonar can be used for internet scanning and data collection to gain insight into exposure of common services and vulnerabilities. Security data from such sources can be combined to examine scanning and probing behavior, as well as the attempted exploitation of high-profile vulnerabilities by nodes participating in a given computer network.

Gleaning actionable data and intelligence from collected security data to perform meaningful security operations requires analyzing the security data to determine how and why computing devices and user and/or attacker behaviors positively or negatively affect an organization's security risk calculus. Cluster analysis or clustering is a common technique to perform statistical data analysis. Clustering involves grouping a set of objects (e.g., data points associated with computing assets) in such a way that objects in the same group (a cluster) are more similar (in some sense) to each other than to those in other groups (clusters).

Therefore, in cybersecurity environments, discovering families or groupings that exist naturally in a dataset is useful for performing time-sensitive security operations. Although clustering is a standard approach, the effective use of clustering requires output labels (e.g., labels identifying groups of data points based on similarity) to be stable and robust in order to accurately detect and reflect the underlying grouping of assets.

Existing clustering methodologies face several significant shortcomings with respect to performing cluster detection and elimination. For example, existing clustering approaches (e.g., existing clustering algorithms and machine learning models that are generated based on such algorithms) require a user to input an initial value for the number of clusters to search for in a given dataset. Each given data point in the dataset is then assigned to the pre-specified number of clusters. The foregoing approach is undesirable in cases where the user does not possess a priori knowledge regarding what the appropriate number of clusters should be prior to processing a given dataset with a clustering algorithm (e.g., the appropriate number of output labels indicative of asset similarities) because results of such an analysis can be arbitrary (e.g., minor variations in a dataset can result in a clustering algorithm finding spurious clusters—output labels that do not accurately reflect the underlying group of assets).

Therefore, depending on the output of existing clustering algorithms to detect meaningful clusters is imprudent because the instability of results provided by existing clustering algorithms puts the validity of those clusters in doubt. Moreover, existing ensemble clustering methodologies, which use multiple clustering algorithms to obtain better predictive performance than could be obtained from any of the constituent clustering algorithms, merely enable the construction of optimal clusters and are not geared towards providing more accurate clustering results in scenarios where clustering is susceptible to noise in a dataset leading to unwanted variation in such clustering results.

Unfortunately, at least because (1) existing machine learning tools for cluster analysis are susceptible to noise in a dataset that can lead to unwanted variation in clustering results and (2) existing ensemble clustering methods focus on constructing optimal clusters and are not configured for robust cluster detection and elimination, security data analysis using machine learning techniques to determine abnormal computing actions associated with vulnerable users and malicious attackers in scenarios where the number of clusters is unknown at the outset is unreliable, which negatively affects the implementation of effective and time-sensitive offensive and defensive security actions in modern cybersecurity computing environments.

Disclosed herein are methods, systems, and processes for robust cluster detection and elimination in security environments using ensemble techniques.

Example Security Server to Perform Cluster Detection and Elimination

FIG. 1 is a block diagram 100 of a security server 105 that performs cluster detection and elimination in security computing environments, according to one embodiment. As shown in FIG. 1, security server 105 is communicatively coupled to a computing cluster 135 via a network 145. Computing cluster 135 is a cluster of computing devices (e.g., physical or virtual computing assets such as desktops, laptops, smartphones, tablets, virtual machines, containers, nodes, bots, honeypots, and the like) and includes computing devices 140(1)-(N). Any type of network and/or interconnection other than or in addition to network 145 can be used to facilitate communication between security server 105 and computing cluster 135. As noted, security server 105 and computing devices 140(1)-(N) can each be any of a variety of physical and/or virtual computing devices, and can be implemented in the cloud.

Security server 105 includes at least a cluster detector 110 to perform cluster detection and elimination. Cluster detector 110 includes at least a cluster data manager 115, an ensemble manager 120, a centroid locator 125, and a shared assets manager 130. Cluster data manager 115 organizes and manages security data received from one or more security data collection tools. Such security data includes, but is not limited to, attacker methodology data, credential events data, and/or exploitation events data (e.g., number of connections, average duration of connections, number of exploitation attempts, geolocation of a given computing asset, number of computing assets, a particular asset behavior, number of users, a particular user behavior, number of login attempts, average duration of user session, number of vulnerability scans, a particular security vulnerability, and the like).

Ensemble manager 120 implements and executes at least two (or more) clustering methodologies (e.g., clustering algorithms such as K-Means, Agglomerative, Mean-Shift, Density-based spatial clustering of applications with noise (DBSCAN), Expectation Maximization (EM), and the like). In one embodiment, ensemble manager 120 independently processes one or more datasets that include security data associated with computing devices 140(1)-(N) received by cluster data manager 115 using at least two clustering algorithms. By applying more than one clustering algorithm to a given dataset, ensemble manager 120 permits the simultaneous detection or discovery of clusters by more than one clustering methodology.

Unfortunately, identifying potential matches between clusters requires the performance of methods and processes in addition to merely reading cluster labels (e.g., output labels produced by the application of multiple clustering algorithms) because output labels assigned by clustering methodologies can be arbitrary (or random). For example, one clustering algorithm might label a cluster "geospatial location London" while another clustering algorithm might label a cluster "geospatial location England" although computing assets associated with data points in both clusters are identical. Therefore, because meaningful cybersecurity intelligence regarding the analyzed security data is associated with computing assets that are grouped together (and not based on particular value of output labels—which merely reflect the order in which a given cluster algorithm keeps track of the clusters), in certain embodiments, cluster detector 110 implements centroid locator 125 and shared assets manager 130 to compare clusters to detect valid clusters and eliminate spurious clusters.

A centroid is a vector that includes one number for each variable, where each number is the mean of a variable for the observations in that cluster. Therefore, a centroid is a multi-dimensional average of a cluster. A feature is an individual measurable property or characteristic of a phenomenon being observed (e.g., whether a data point associated with a computing asset indicates that the computing asset has a particular geospatial location or an Internet Protocol (IP) address, executes a particular software process, and the like). A feature vector is an n-dimensional vector of numerical features that represent an object, and the vector space associated with such vectors is called feature space.

In one embodiment, post ensemble clustering of a given dataset, if a centroid of a cluster is located near another centroid of another cluster in feature space relative to other centroids of other clusters, centroid locator 125 determines that the two clusters match (e.g., regardless of the labels outputted by the ensemble clustering algorithms). In another embodiment, if a cluster and another cluster share a significant number of data points associated with computing devices relative to other clusters (e.g., based on a predetermined threshold such as greater than 50% similarity), shared assets manager 130 determines that the two clusters match (e.g., regardless of the labels outputted by the ensemble clustering algorithms). Because the number of clusters are unknown at the outset, the foregoing additional processing is performed by centroid locator 125 and shared assets manager 130 to determine whether two (or more) clusters match.

Example of Cluster Identification Using Ensemble Methods

Figure 2:
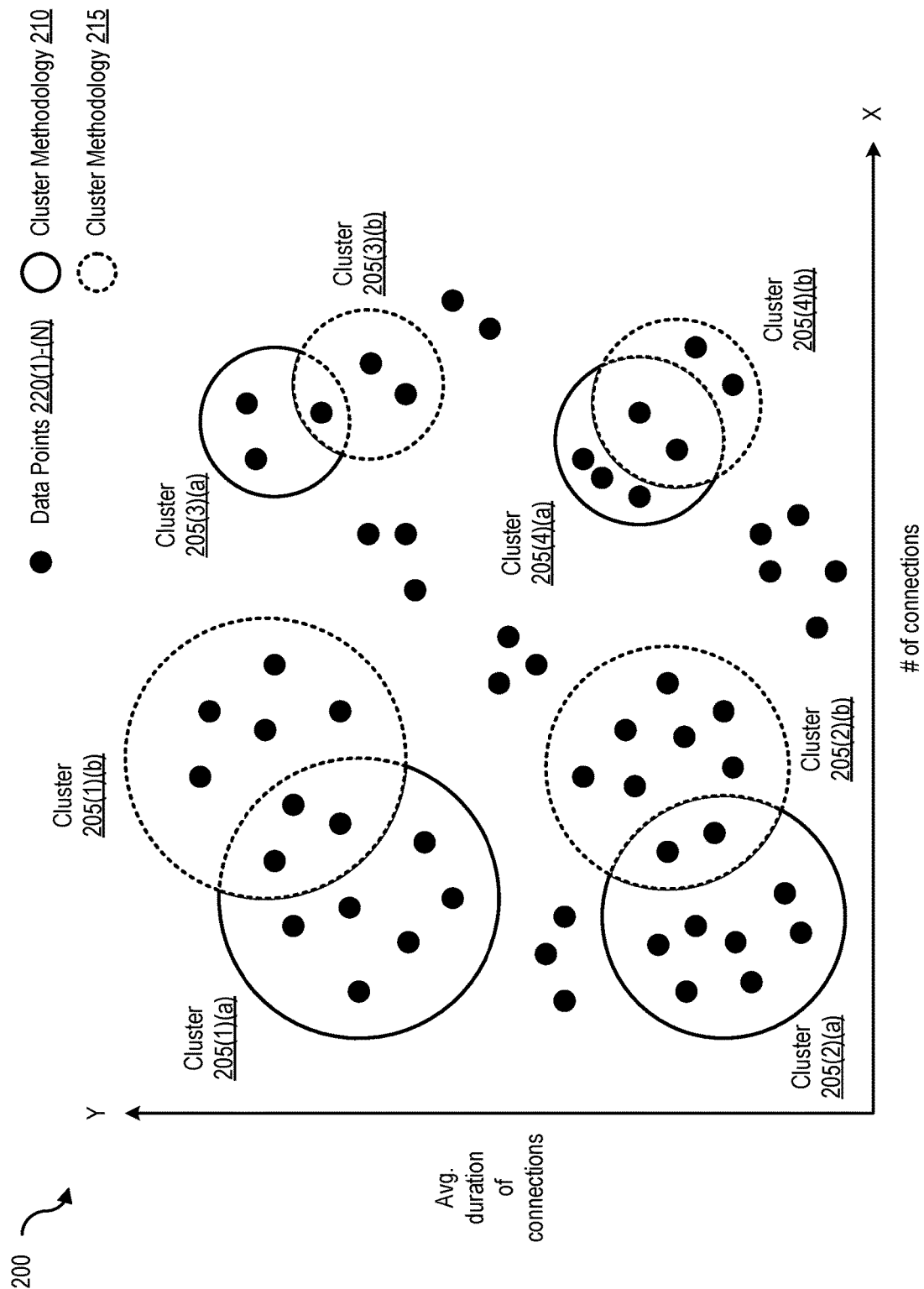
FIG. 2 is a schematic diagram 200 illustratively depicting the training of a cluster detection and elimination model, according to one embodiment of the present disclosure.

FIG. 2 is a schematic diagram 200 illustratively depicting the training of a cluster detection and elimination model, according to one embodiment. As shown in FIG. 2, a given dataset with datapoints 220(1)-(N) is processed by two clustering methodologies—cluster methodology 210 and cluster methodology 215. Processing the dataset with datapoints 220(1)-(N) using cluster methodologies 210 and 215 results in clusters 205(1)(a), 205(2)(a), 205(3)(a), and 205(4)(a) generated by cluster methodology 210 and clusters 205(1)(b), 205(2)(b), 205(3)(b), and 205(4)(b) generated by cluster methodology 215. It should be noted that datapoints extraneous to the aforementioned clusters can be part of other clusters generated by other clustering methodologies (not shown in FIG. 2).

As shown in FIG. 2, several datapoints are detected by both cluster methodologies 210 and 215. Prior to performing the post-ensemble method optimized comparison as discussed above, cluster detector 110 trains a cluster detection and elimination model by accessing a dataset with raw data (e.g., security data with one or more variables) that includes datapoints associated with computing devices (e.g., one or more computing devices 140(1)-(N)) in a network (e.g., network 145) using cluster data manager 115. Ensemble manager 120 then applies at least two clustering methodologies (e.g., cluster methodologies 210 and 215) independently to the dataset. Cluster detector 110 then compares the result of the ensemble cluster methodology by performing cluster comparison based on at least (1) centroid locations (e.g., using centroid locator 125) and (2) shared data points (e.g., using shared assets manager 130) to determine whether a given cluster detected and/or discovered by the ensemble cluster methodology matches another cluster detected and/or discovered by the ensemble cluster methodology, regardless of the cluster label(s) outputted by the ensemble cluster methodology.

In one embodiment, cluster detector 110 trains the cluster detection and elimination model by applying at least two clustering methodologies independently to the dataset without indicating a value for an initial cluster starting point at least because the value for the initial cluster starting point is unknown or randomized prior to the application of the at least two clustering methodologies. In either case, the cluster detection and elimination model accounts for an arbitrary assignment for the initial cluster starting point without negatively affecting cluster detection.

As previously noted, and in certain embodiments, post-ensemble method optimized comparison involves centroid locator 125 comparing clusters based on centroid locations to determine whether a centroid of a cluster is located near another centroid of another cluster in feature space relative to other centroids of other clusters, and shared assets manager 130 comparing clusters based on shared data points to determine whether the cluster and another cluster share a significant number of data points relative to the other clusters.

Based on the foregoing post-ensemble method optimized comparisons performed by centroid locator 125 and shared assets manager 130, security server 105 at least (1) isolates a spurious cluster, (2) inhibits computing devices identified by data points in the spurious cluster from being included in a security operation, (3) identifies computing devices associated with data points in a non-spurious cluster, and/or (4) designates the computing devices associated with the data points in the non-spurious cluster in the security operation.

Therefore, cluster detector 110 can improve the reliability of cluster identification and detection in machine learning scenarios where the number of clusters is unknown at the outset (e.g., at least because any initially provided value for the number of clusters is arbitrary). Because cluster detection and elimination performed in this manner is more reliable, security actions tied to variables associated with such cluster analysis can be acted upon (or not acted upon) in a timely manner—positively improving an organization's security response and/or preparedness in the former instance, and/or saving significant computing resources that would have otherwise been used to perform redundant security operations in the latter instance.

Example Cluster Detection and Elimination Table

FIG. 3 is a table 300 maintained by a security server that can be used to perform cluster detection and elimination, according to one embodiment. In one embodiment, a cluster detection and elimination table 305 is maintained by security server 105 and includes at least a dimension 'X' field, a dimension 'Y' field 315, a data points field 320, a first clustering methodology field 325, a second cluster methodology field 330, a clusters comparison field 335, a centroid locations field 340, a shared assets field 345, and a security action field 350. In certain embodiments, cluster detection and elimination table 305 can be used by security server 105 to include or exclude computing devices from being part of one or more security operations.

In one embodiment, based on the number of connections and the average duration of connections provided by cluster data manager 115, ensemble manager 120 applies the K-Means and Agglomerative clustering algorithms to data points 220(1)-(300) and detects clusters 205(1) and 205(3). Centroid locator 125 determines that the centroid of cluster 205(1) is not located near the centroid of cluster 205(3) and shared assets manager 130 determines that clusters 205(1) and 205(3) share few data points relative to other clusters. Therefore, cluster detector 110 designates the spurious cluster(s) for elimination (e.g., inhibits computing devices that are associated with data points in the spurious cluster(s) from being included in a security operation).

In another embodiment, based on the number of attempts and the geolocation 'xyz' provided by cluster data manager 115, ensemble manager 120 applies the Mean-Shift and K-Means clustering algorithms to data points 220(1)-(200) and detects clusters 205(1) and 205(2). Centroid locator 125 determines that the centroid of cluster 205(1) is located near the centroid of cluster 205(2) and shared assets manager 130 determines that clusters 205(1) and 205(2) share a large number of data points relative to other clusters. Therefore, cluster detector 110 designates the cluster(s) as valid (e.g., includes computing devices that are associated with data points in the valid cluster(s) in a security operation).

In some embodiments, based on the number of assets and asset behavior 'abc' provided by cluster data manager 115, ensemble manager 120 applies the DBSCAN and EM clustering algorithms to data points 220(1)-(250) and detects clusters 205(3) and 205(5). Centroid locator 125 determines that a centroid of cluster 205(3) is located near the centroid of cluster 205(5) but shared assets manager 130 determines that clusters 205(3) and 205(5) share few data points relative to other clusters. Therefore, cluster detector 110 designates the spurious cluster(s) for elimination (e.g., inhibits computing devices that are associated with data points in the spurious cluster(s) from being included in a security operation).

In other embodiments, if a subset of data points in a dataset are part of two (or more) clusters as the result of ensemble clustering performed by ensemble manager 120, and centroid locator 215 and/or shared assets manager 130 determine that the resultant clusters associated with those data points do not match, cluster detector 110 designates such non-matching clusters as spurious clusters and eliminates such spurious clusters (e.g., from a security action).

In one embodiment, based on the number of users and user behavior 'pqr' provided by cluster data manager 115, ensemble manager 120 applies the Agglomerative and K-Means clustering algorithms to data points 220(1)-(350) and detects clusters 205(2) and 205(4). Centroid locator 125 determines that the centroid of cluster 205(2) is not located near the centroid of cluster 205(4) but shared assets manager 130 determines that clusters 205(2) and 205(4) share a large number of data points relative to other clusters. Therefore, cluster detector 110 designates the cluster(s) as valid (e.g., includes computing devices that are associated with data points in the valid cluster(s) in a security operation).

In another embodiment, based on the number of logins and the average duration of the session provided by cluster data manager 115, ensemble manager 120 applies the K-Means and DBSCAN clustering algorithms to data points 220(1)-(150) and detects clusters 205(1) and 205(5). Centroid locator 125 determines that the centroid of cluster 205(1) is located near the centroid of cluster 205(5) and shared assets manager 130 determines that clusters 205(1) and 205(5) share a large number of data points relative to other clusters. Therefore, cluster detector 110 designates the cluster(s) as valid (e.g., includes computing devices that are associated with data points in the valid cluster(s) in a security operation).

In some embodiments, based on the number of scans and the vulnerability 'mno' provided by cluster data manager 115, ensemble manager 120 applies the K-Means and Mean-Shift clustering algorithms to data points 220(1)-(450) and detects clusters 205(4) and 205(5). Centroid locator 125 determines that a centroid of cluster 205(4) is not located near the centroid of cluster 205(5) and shared assets manager 130 determines that clusters 205(4) and 205(5) share few data points relative to other clusters. Therefore, cluster detector 110 designates the spurious cluster(s) for elimination (e.g., inhibits computing devices that are associated with data points in the spurious cluster(s) from being included in a security operation).

In other embodiments, if a subset of data points in a dataset are part of two (or more) clusters as the result of ensemble clustering performed by ensemble manager 120, and centroid locator 215 and/or shared assets manager 130 determine that the resultant clusters associated with those data points match, cluster detector 110 designates such matching clusters as valid clusters and keeps/maintains such valid clusters (e.g., to be included in a security action).

Example Processes for Cluster Detection and Elimination

Figure 4:
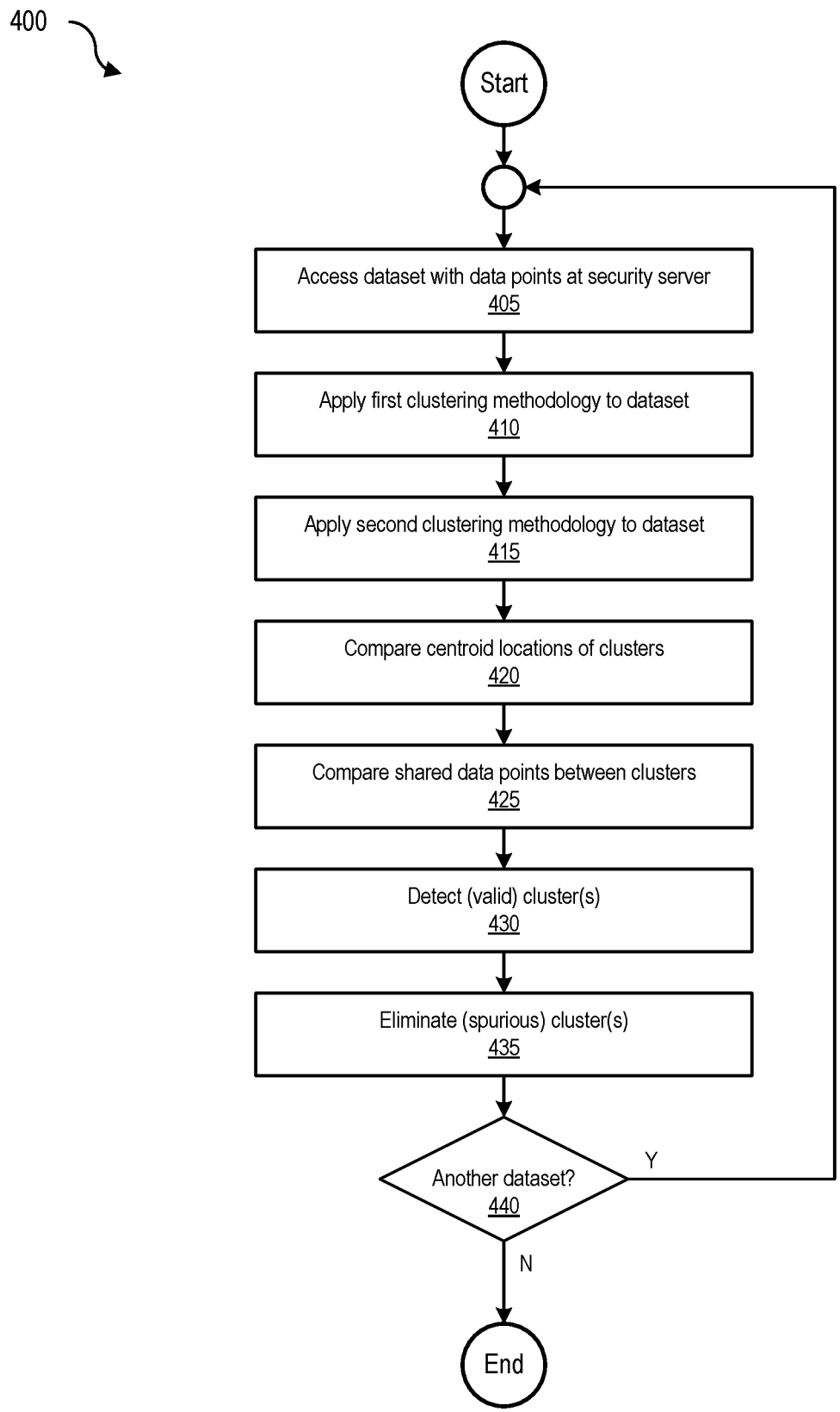
FIG. 4 is a flowchart 400 that illustrates a process to eliminate spurious clusters in security environments, according to one embodiment of the present disclosure.

FIG. 4 is a flowchart 400 that illustrates a process to eliminate spurious clusters in security environments, according to one embodiment. The process begins at 405 by accessing a dataset with data points at a security server (e.g., security server 105 as shown in FIG. 1). The process then performs ensemble clustering on the dataset. For example, at 410, the process applies a first clustering methodology to the dataset (e.g., K-Means), and at 415, applies a second clustering methodology to the dataset (e.g., DBSCAN) clustering (or grouping) the data points into at least two (or more) clusters.

To make clustering more reliable in scenarios where the number of clusters is unknown at the outset, after performing ensemble clustering on the dataset, the process, at 420, compares the centroid locations of the (resultant) clusters (e.g., by determining whether the centroids of the clusters being compared are located (very) near each other in feature space). For example, centroid locator 125 determines the mean vector location for each cluster and determines the distance between the two centroids (e.g., $d_{12}=d(x, y)$, where $d(x, y)$ is the distance between a variable with observation vector x and a variable with observation vector y).

At 425, the process further compares shared data points between the clusters. For example, if the clusters being compared share a large number of assets (e.g., specified by a record identifier) relative to other clusters, the process determines that the clusters being compared match. At 430, based on the comparison based on centroid locations and shared data points, the process detects valid clusters and eliminates spurious clusters (thus improving the reliability of cluster detection). At 440, the process determines if there is another dataset. If there is another dataset (for analysis), the process loops to 405. Otherwise, the process ends.

Figure 5:
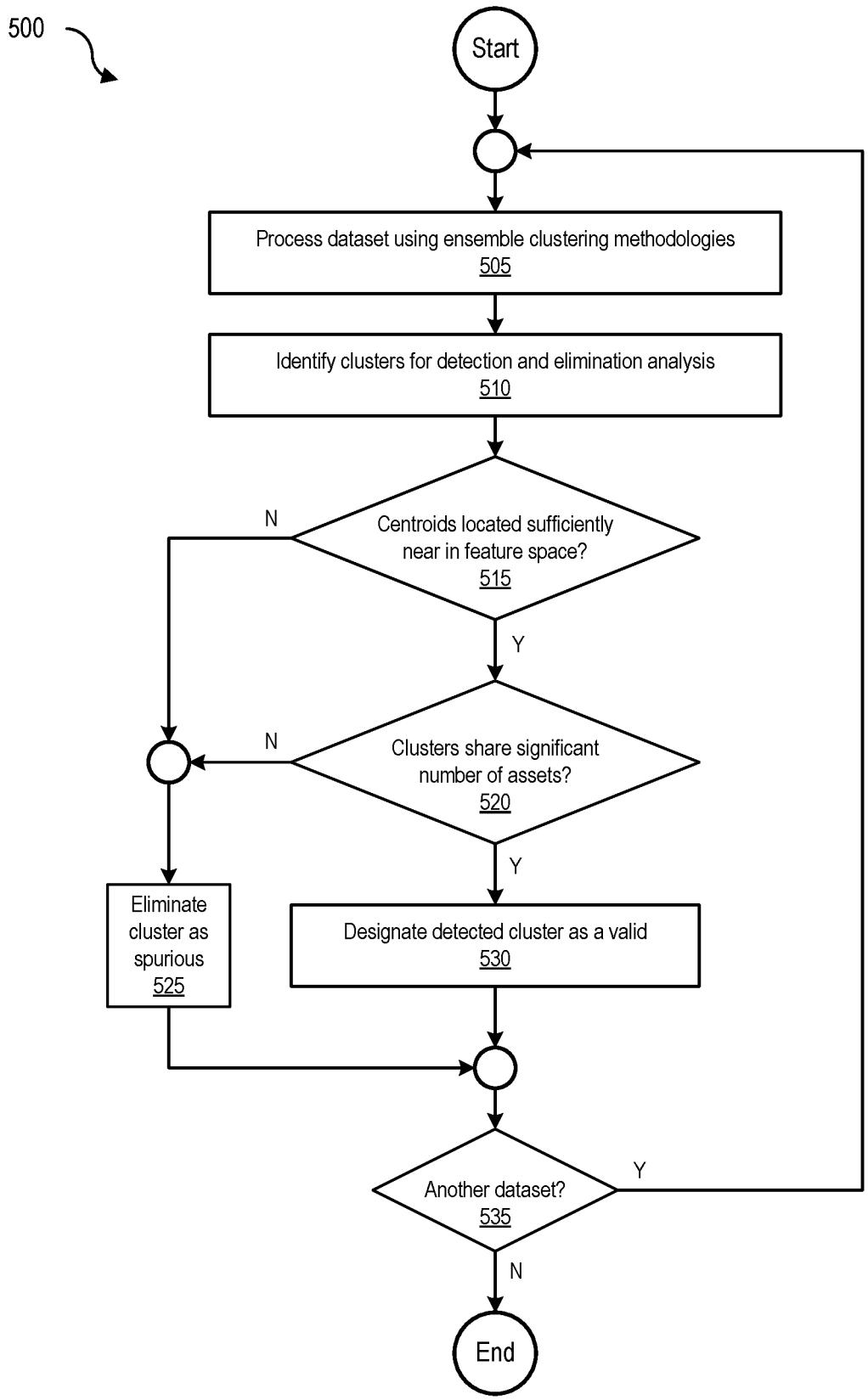
FIG. 5 is a flowchart 500 that illustrates a process to designate computing devices in a cluster for a security operation, according to one embodiment of the present disclosure.

FIG. 5 is a flowchart 500 that illustrates a process to designate computing devices in a cluster for a security operation, according to one embodiment. The process begins at 505 by processing a dataset using ensemble clustering methodologies (e.g., because clusters derived through multiple clustering methods are more reliable than clusters derived through singular methods, which may be nothing more than spurious outputs). At 510, the process identifies clusters for (further) detection and elimination analysis (e.g., post-ensemble method optimized comparison to account for the random nature of output label assignment, as discussed above).

At 515, the process determines whether the centroids (of the clusters being compared) are located sufficiently near (each other) in feature space (e.g., based on a predetermined threshold that can be adjusted after each iteration/training instance of the cluster detection and elimination model that uses the disclosed ensemble clustering methodology). If the clusters are not located sufficiently near each other in feature space, the process, at 525, eliminates the cluster as spurious. However, if the clusters are located sufficiently near each other in feature space, the process, at 520, determines whether the clusters (being compared) share a significant number of assets (e.g., as specified by a record identifier). If the clusters being compared do not share a significant number of assets (e.g., data points), the process, at 525, eliminates the cluster as spurious. However, if the clusters being compared share a significant number of assets, the process, at 530, designates the detected cluster(s) as valid. At 535, the process determines if there is another dataset. If there is another dataset (for analysis), the process loops to 505. Otherwise, the process ends.

Figure 6:
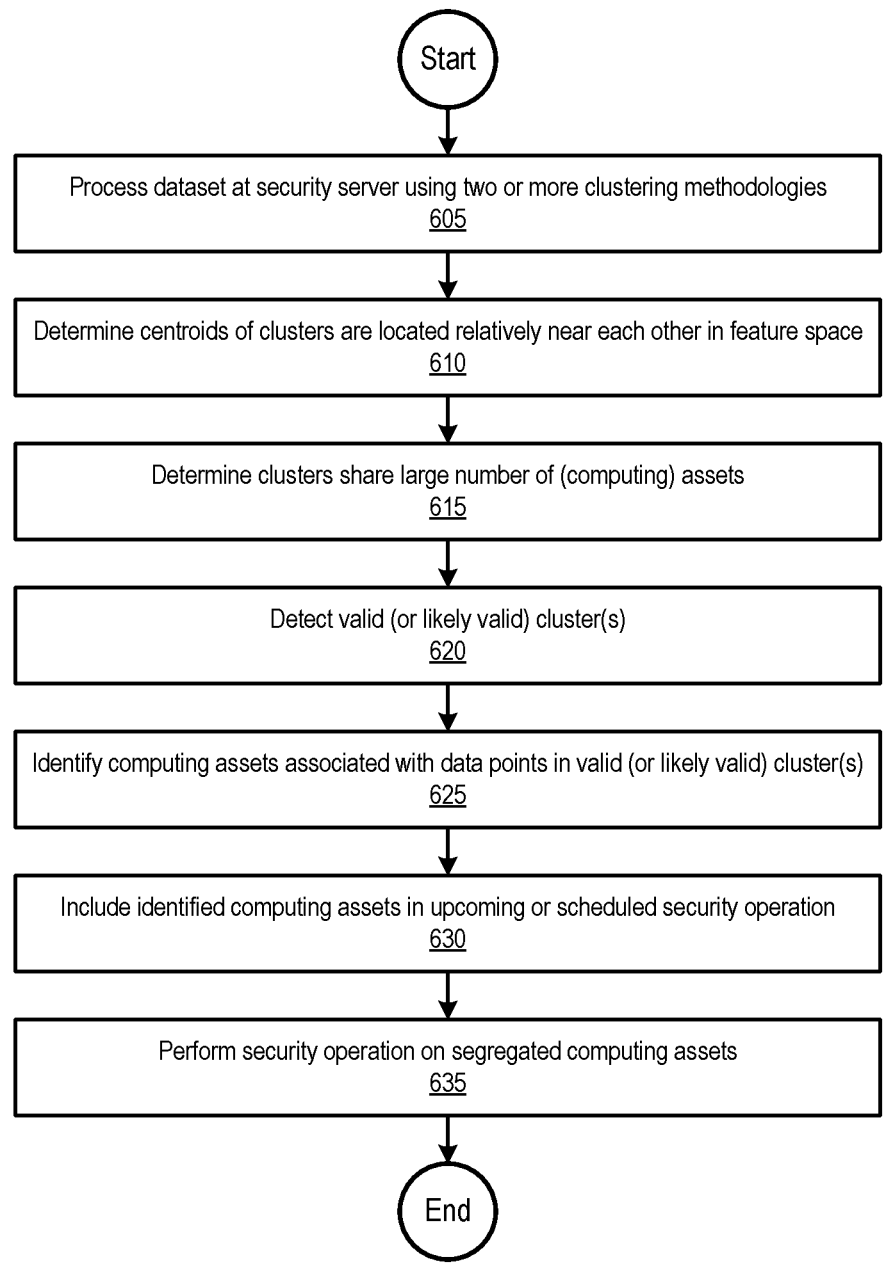
FIG. 6 if a flowchart 600 that illustrates a process to perform a security operation on segregated computing assets, according to one embodiment of the present disclosure.

FIG. 6 if a flowchart 600 that illustrates a process to perform a security operation on segregated computing assets, according to one embodiment. The process begins at 605 by processing a dataset at a security server using two (or more) clustering methodologies (e.g., clustering algorithms such as K-Means, Mean-Shift, DBSCAN, and the like). At 610, the process determines that the centroids of the (resultant) clusters (being compared) are located relatively near each other in feature space (e.g., relative to other centroids of other clusters), and at 615, the process determines that the clusters share a large number of (computing) assets (e.g., computing assets associated with corresponding data points in the clusters being compared). In this example, the processes of steps 610 and 615 are referred to as 'post-ensemble method optimized comparison' (e.g., performed after ensemble clustering to further improve the reliability of cluster detection and to account for the random nature of output label assignment).

At 620, the process detects valid (or likely valid) clusters, and at 625, identifies computing assets associated with data points in the valid (or likely valid) clusters (e.g., a subset of computing devices 140(1)-(N)). At 630, the process includes (or designates for inclusion) the identified computing assets in one or more upcoming and/or scheduled security operations and ends at 635 by performing the security operation on the segregated computing assets. In this manner, the process of FIG. 6 improves the reliability of cluster detection for security operation performance in cybersecurity computing environments.

Figure 7:
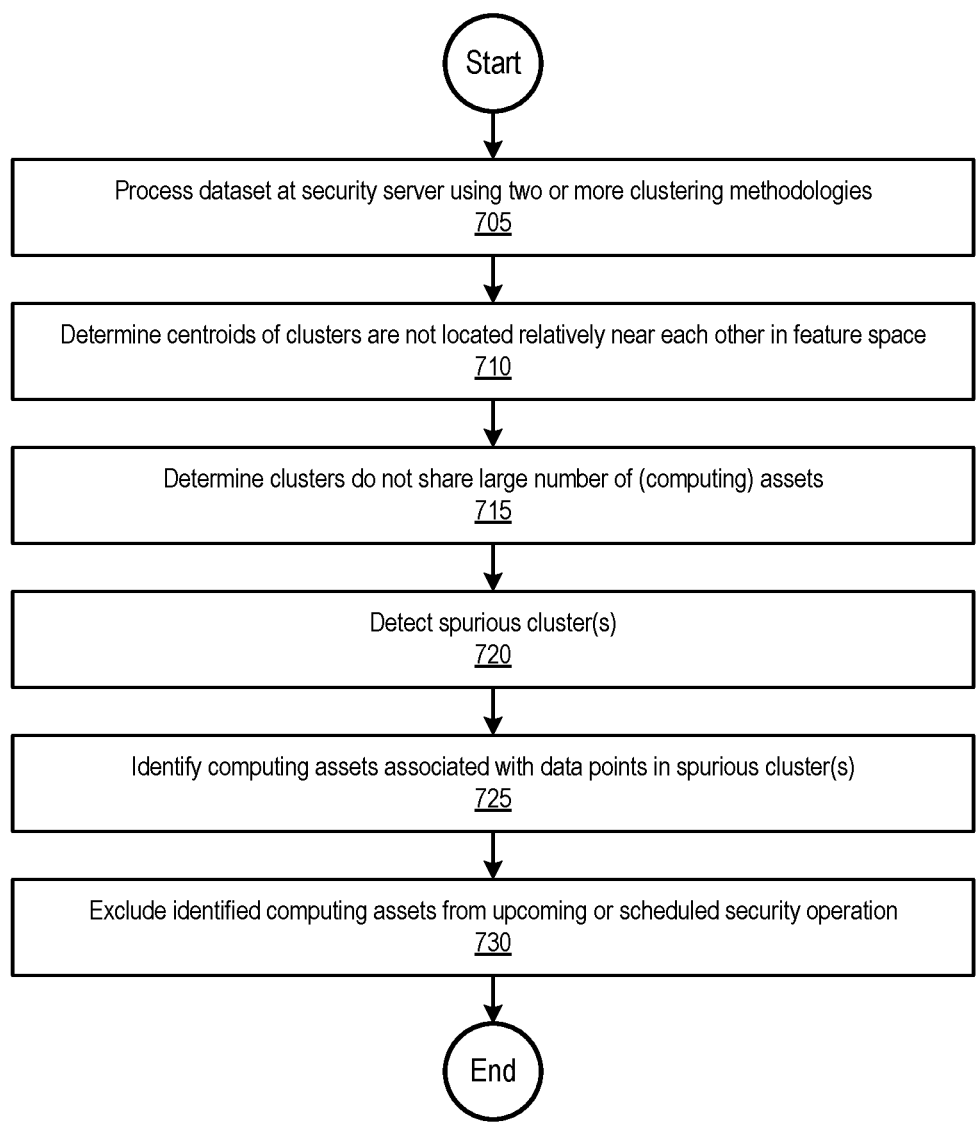
FIG. 7 is a flowchart 700 that illustrates a process to exclude computing assets from a security operation, according to one embodiment of the present disclosure.

FIG. 7 is a flowchart 700 that illustrates a process to exclude computing assets from a security operation, according to one embodiment. The process begins at 705 by processing a dataset at a security server using two or more clustering methodologies (e.g., ensemble clustering). At 710, the process determines that the centroids of the (resultant) clusters (being compared) are not located near other in feature space (e.g., relative to other centroids of other clusters produced by the ensemble clustering), and at 715, the determines that the clusters do not share a large (or significant) number of (computing assets) (e.g., data points).

At 720, the process detects spurious (or likely spurious) clusters, and at 725, identifies computing assets associated with data points in the spurious (or likely spurious) clusters (e.g., a subset of computing devices 140(1)-(N)). The process ends at 730 by excluding the identified computing assets from one or more upcoming and/or scheduled security operations. In this manner, the process of FIG. 7 eliminates spurious clusters in cybersecurity computing environments, thereby saving valuable (and expensive) computing resources that would have otherwise been dedicated to performing redundant (or unwanted) security operations.

Example Computing Environment

Figure 8:
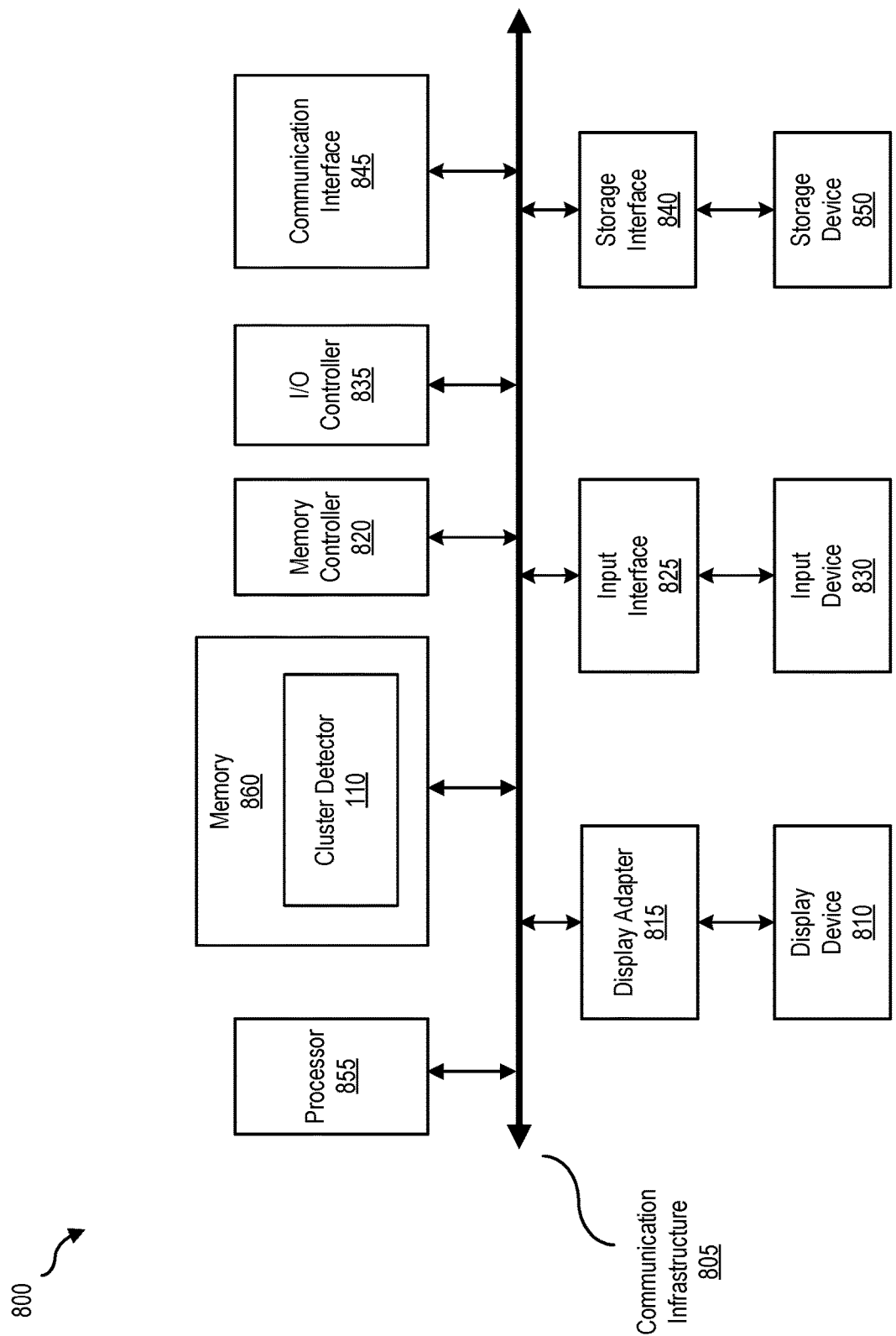
FIG. 8 is a block diagram 800 of a computing system, illustrating how a cluster detector can be implemented in software, according to one embodiment of the present disclosure.

FIG. 8 is a block diagram 800 of a computing system, illustrating how a cluster detector 110 can be implemented in software, according to one embodiment. Computing system 800 can include security server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes cluster detector 110, computing system 800 becomes a special purpose computing device that is configured to perform cluster detection and elimination in (cyber) security (computing) environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing cluster detector 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
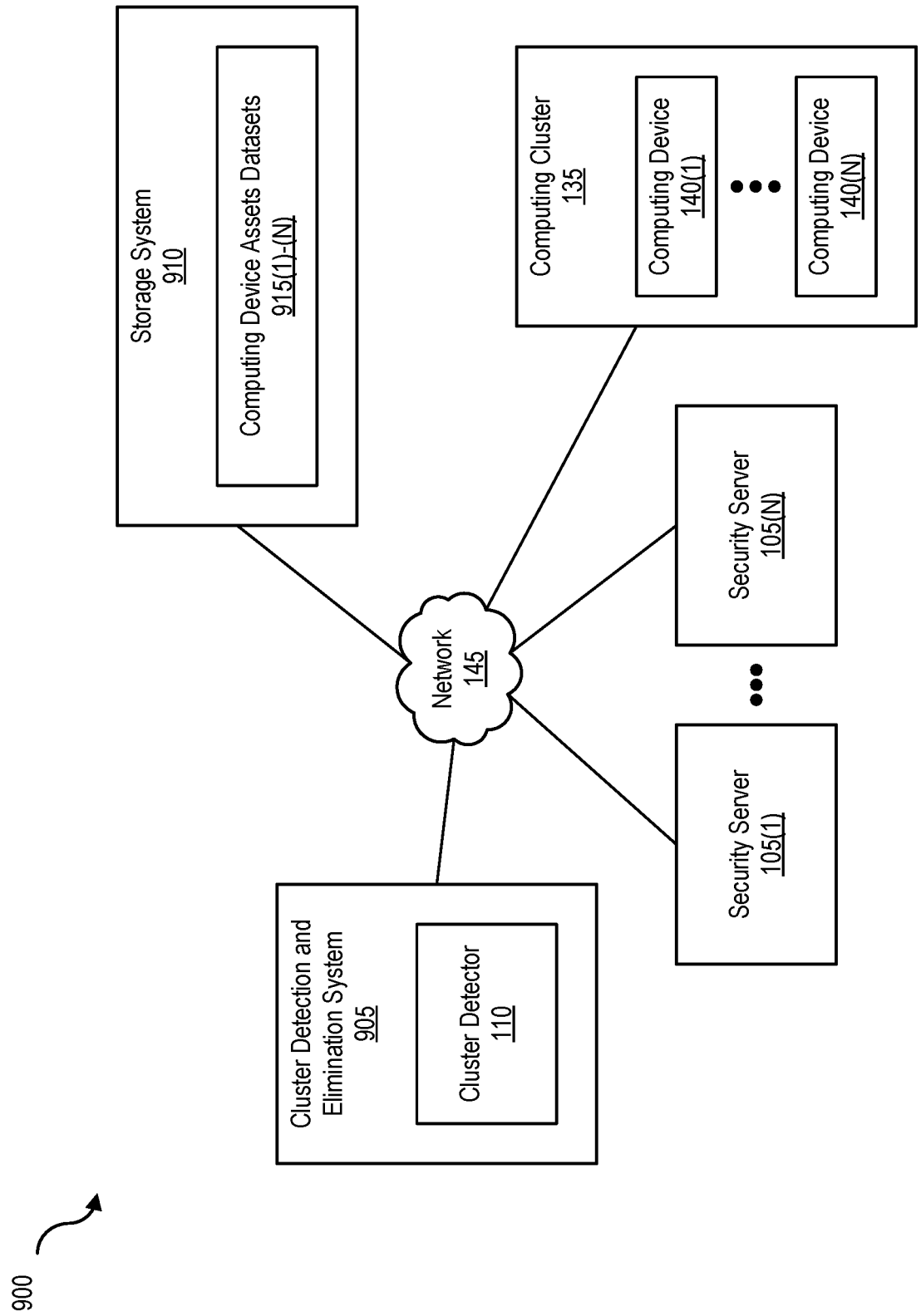
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 145 generally represents any type or form of computer network or architecture capable of facilitating communication between security server 105 and computing cluster 135. For example, network 145 can be a Wide Area Network (WAN) (e.g., the Internet) or a Local Area Network (LAN). In certain embodiments, a communication interface, such as communication interface 845 in FIG. 8, may be used to provide connectivity between security server 105 and computing cluster 135, and network 145. In some embodiments, cluster detector 110 may be part of security server 105, or may be separate, and all or a portion of one or more of the disclosed embodiments may be encoded as a computer program and loaded onto and executed by security server 105, and distributed over network 145. The embodiments described and/or illustrated herein are not limited to the Internet or any particular network-based environment.

In some examples, all or a portion of security server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, cluster detector 110 may transform the behavior of security server 105 and/or cluster detection and elimination system 905 to perform cluster detection and elimination in security environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    accessing a dataset comprising attacker methodologies, credential events, and exploitation events, wherein
        the dataset comprises a plurality of data points, and
        each data point of the plurality of data points is associated with a computing device of a plurality of computing devices in a network;
    applying at least two clustering methodologies independently to the dataset without indicating a value for an initial cluster starting point and assigning an arbitrary value for the initial cluster starting point;
    comparing a result of the applying, wherein
        the result comprises at least two or more clusters, each derived from separate clustering methodologies of the at least two clustering methodologies,
        the comparing comprises determining whether a cluster of the two or more clusters matches another cluster of the two or more clusters based on centroid locations and shared data points regardless of an output label of the cluster and another output label of the another cluster generated by the at least two clustering methodologies, and
        the matching indicates that the cluster and the another cluster share an insignificant number of computing devices of the plurality of computing devices based on a first threshold associated with the centroid locations and a second threshold associated with the shared data points; and
    based on the comparing,
        isolating the cluster and the another cluster as spurious clusters, eliminating the spurious clusters from the result, and
        inhibiting the insignificant number of computing devices from being included in a security operation intended for the plurality of computing devices in the network.

2. The computer-implemented method of claim 1, wherein the value for the initial cluster starting point is unknown or randomized prior to the application of the at least two clustering methodologies independently to the dataset to enable assignment of the arbitrary value for the initial cluster starting point without negatively affecting cluster detection.

3. The computer-implemented method of claim 1, wherein
    the comparing based on the centroid locations comprises determining whether a centroid of the cluster is located near another centroid of the another cluster in feature space relative to other centroids of other clusters of the at least two or more clusters.

4. The computer-implemented method of claim 1, wherein
    the comparing based on the shared data points comprises determining whether the cluster and the another cluster share a significant number of data points of the plurality of data points associated with the plurality of computing devices relative to other clusters of the at least two or more clusters.

5. The computer-implemented method of claim 1, further comprising:
    training a cluster detection and elimination model, wherein
        the cluster detection and elimination model is configured to identify and exclude the insignificant number of computing devices from the security operation intended for the plurality of computing devices.

6. The computer-implemented method of claim 1, wherein the dataset comprises raw security data.

7. A non-transitory computer readable storage medium comprising program instructions executable to:
    access a dataset comprising attacker methodologies, credential events, and exploitation events, wherein
        the dataset comprises a plurality of data points, and
        each data point of the plurality of data points is associated with a computing device of a plurality of computing devices in a network;
    apply at least two clustering methodologies independently to the dataset without indicating a value for an initial cluster starting point and assigning an arbitrary value for the initial cluster starting point;

compare a result of the applying, wherein
the result comprises at least two or more clusters, each derived from separate clustering methodologies of the at least two clustering methodologies, the comparing comprises determining whether a cluster of the two or more clusters matches another cluster of the two or more clusters based on centroid locations and shared data points regardless of an output label of the cluster and another output label of the another cluster generated by the at least two clustering methodologies, and the matching indicates that the cluster and the another cluster share an insignificant number of computing devices of the plurality of computing devices based on a first threshold associated with the centroid locations and a second threshold associated with the shared data points; and based on the comparing,
isolate the cluster and the another cluster as spurious clusters, eliminate the spurious clusters from the result, and inhibit the insignificant number of computing devices from being included in a security operation intended for the plurality of computing devices in the network.

8. The non-transitory computer readable storage medium of claim 7, wherein the comparing based on the centroid locations comprises determining whether a centroid of the cluster is located near another centroid of the another cluster in feature space relative to other centroids of other clusters of the at least two or more clusters, and the comparing based on the shared data points comprises determining whether the cluster and the another cluster share a significant number of data points of the plurality of data points associated with the plurality of computing devices relative to other clusters of the at least two or more clusters.

9. The non-transitory computer readable storage medium of claim 8, wherein the value for the initial cluster starting point is unknown or randomized prior to the application of the at least two clustering methodologies independently to the dataset to enable assignment of the arbitrary value for the initial cluster starting point without negatively affecting cluster detection.

10. The non-transitory computer readable storage medium of claim 7, further comprising:

training a cluster detection and elimination model, wherein
the cluster detection and elimination model is configured to identify and exclude the insignificant number of computing devices from the security operation intended for the plurality of computing devices.

11. A system comprising:
one or more processors; and
a memory coupled to the one or more processors, wherein the memory stores program instructions executable by the one or more processors to:

access a dataset comprising attacker methodologies, credential events, and exploitation events, wherein
the dataset comprises a plurality of data points, and
each data point of the plurality of data points is associated with a computing device of a plurality of computing devices in a network;

apply at least two clustering methodologies independently to the dataset without indicating a value for an initial cluster starting point and assigning an arbitrary value for the initial cluster starting point;

compare a result of the applying, wherein
the result comprises at least two or more clusters, each derived from separate clustering methodologies of the at least two clustering methodologies, the comparing comprises determining whether a cluster of the two or more clusters matches another cluster of the two or more clusters based on centroid locations and shared data points regardless of an output label of the cluster and another output label of the another cluster generated by the at least two clustering methodologies, and the matching indicates that the cluster and the another cluster share an insignificant number of computing devices of the plurality of computing devices based on a first threshold associated with the centroid locations and a second threshold associated with the shared data points; and based on the comparing,
isolate the cluster and the another cluster as spurious clusters, eliminate the spurious clusters from the result, and inhibit the insignificant number of computing devices from being included in a security operation intended for the plurality of computing devices in the network.

12. The system of claim 11, wherein
the comparing based on the centroid locations comprises determining whether a centroid of the cluster is located near another centroid of the another cluster in feature space relative to other centroids of other clusters of the at least two or more clusters, and the comparing based on the shared data points comprises determining whether the cluster and the another cluster share a significant number of data points of the plurality of data points associated with the plurality of computing devices relative to other clusters of the at least two or more clusters.

13. The system of claim 12, wherein
the value for the initial cluster starting point is unknown or randomized prior to the application of the at least two clustering methodologies independently to the dataset to enable assignment of the arbitrary value for the initial cluster starting point without negatively affecting cluster detection.

14. The system of claim 11, further comprising:
training a cluster detection and elimination model, wherein
the cluster detection and elimination model is configured to identify and exclude the insignificant number of computing devices from the security operation intended for the plurality of computing devices.

\* \* \* \* \*